A. E. & A. W. LYMAN,
A. W. LYMAN, Administrator.
Manufacture of Spoons, &c.
No. 220,080. Patented Sept. 30, 1879.
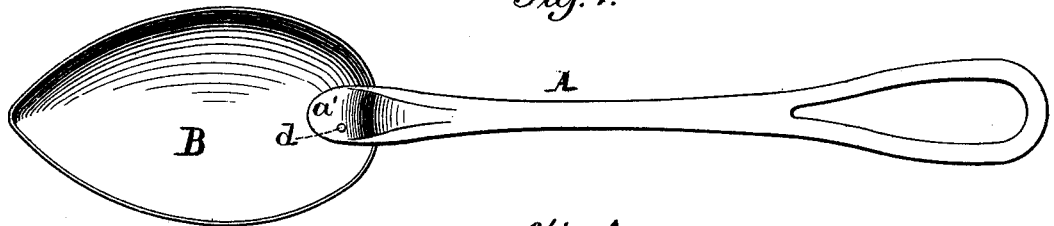
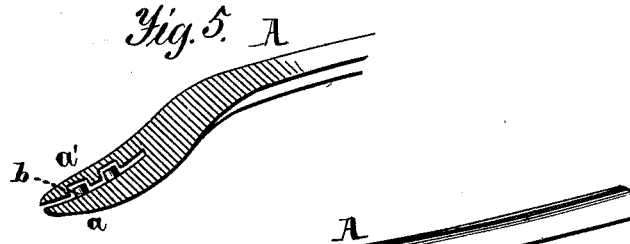
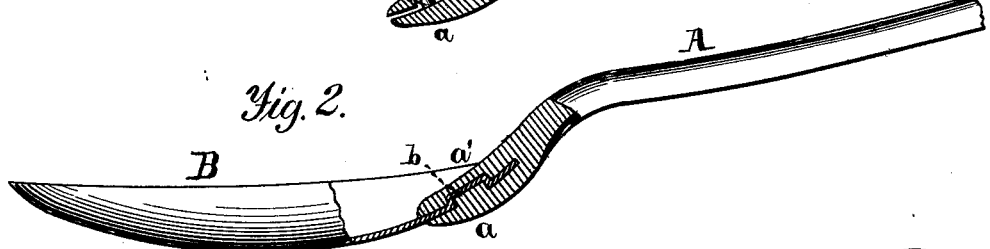
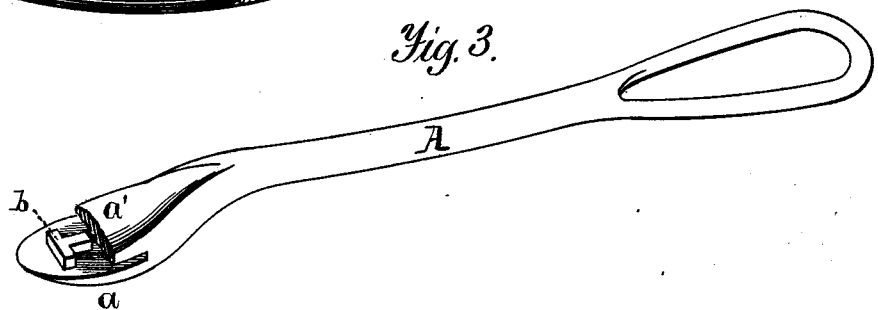
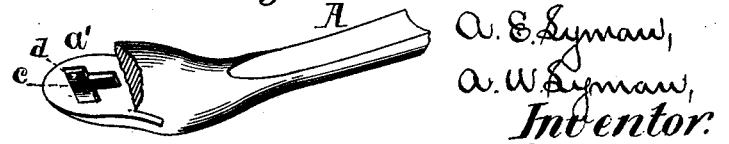

UNITED STATES PATENT OFFICE.

ALFRED E. LYMAN, (ARTHUR W. LYMAN, ADMINISTRATOR,) OF BROOKLYN, NEW YORK, AND ARTHUR W. LYMAN, OF GENEVA, OHIO; SAID A. W. LYMAN ASSIGNOR TO ENTERPRISE MANUFACTURING COMPANY, OF GENEVA, OHIO.

IMPROVEMENT IN THE MANUFACTURE OF SPOONS, &c.

Specification forming part of Letters Patent No. 220,080, dated September 30, 1879; application filed August 14, 1878.

*To all whom it may concern:*

Be it known that we, A. E. LYMAN, of Brooklyn, in the county of Kings and State of New York, and A. W. LYMAN, of Geneva, in the county of Ashtabula and State of Ohio, have invented certain new and useful Improvements in the Manufacture of Spoons, &c.; and we do hereby declare that the following is a full, clear, and exact description thereof, sufficient to enable others skilled in the art to which our invention appertains to make and use the same, reference being had to the accompanying drawings, and to the letters of reference marked thereon, and in which drawings—

Figure 1 is a plan view of our improved spoon, showing the orifice in the upper lip of the handle in which solder is poured. Fig. 2 is a side view, partly in section. Fig. 3 is a perspective view of the handle with a portion of the upper lip broken away, showing the projection on the lower lip. Fig. 4 is an inverted perspective view of the same with the under lip broken away, showing the depression in the upper lip; and Fig. 5 is a modification thereof.

The same part in the several figures is denoted by the same letter.

This invention relates to certain improvements in the manufacture of spoons, ladles, scoops, &c., and has particular or special reference to the manner of connecting the handle to the bowl thereof, its object being to effect a strong, durable, and cheap method of fastening between these parts.

To this end our invention consists in forming the inner end of the handle of a ladle, spoon, scoop, &c., with lips, one having a projection or projections, and the other a depression or depressions, between which the bowl is clamped and secured, substantially as hereinafter more fully set forth.

In the accompanying drawings, A refers to the handle, and B to the bowl, of a spoon, ladle, scoop, or other like article. The handle is formed at one (its inner) end with lips $a$ $a'$, between which the bowl B is fastened, as more fully hereinafter described.

Upon the upper surface of the lower lip, $a$, is formed a projection or projections, $b$, either in the form of a T, or as shown in Fig. 5, while in the lower surface of the upper lip, $a'$, is provided a depression or depressions, $c$ $c$, corresponding in shape with that of the projection or projections $b$ on the lower lip.

The handle may be formed of a thin piece of metal, with its upper surface and sides rounded, and its under surface, which is left concaved or hollow, strengthened with transverse ribs, the object of this construction being to provide a light handle with the requisite strength.

The projections and depressions $b$ $c$ may be made also in a star or other suitable shape, instead of that above ascribed to them, if desired.

To effect the fastening of the handle to the bowl of the spoon, &c., the bowl is inserted between the lips $a$ $a'$ of the handle, and the said lips then subjected to sufficient pressure to cause the projection or projections upon the lower lip to penetrate the bowl, and force the projected portion of the latter into the depression or depressions of the upper lip of the handle, thus effecting the above-mentioned result.

To more effectually fasten the parts together they are also soldered.

For the passage of the solder in under the upper lip or clamp, and into contact with the bowl or disk, a passage formed, it may be, by the depression, is provided, having an opening, $d$, for the entrance of the solder.

Having thus fully described our invention, we claim and desire to secure by Letters Patent—

In the manufacture of spoons, ladles, scoops, &c., the handle formed with lips, one having a projection or projections, and the other a correspondingly-shaped depression or depressions, and the bowl inserted and clamped between said lips, substantially as and for the purpose set forth.

ALFRED E. LYMAN.
ARTHUR W. LYMAN.

Witnesses for Alfred E. Lyman:
CHAS. TALCOTT,
WILLARD W. RICE.

Witnesses for Arthur W. Lyman:
CHAS. S. MALTBIE,
DAN S. ROBERTSON